(12) United States Patent
Grilli et al.

(10) Patent No.: US 11,863,572 B1
(45) Date of Patent: Jan. 2, 2024

(54) ADAPTIVE DATA FILTERING SYSTEM

(71) Applicant: Amazon Technologies, Inc., Seattle, WA (US)

(72) Inventors: Gianluca Grilli, Dublin (IE); Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 1248 days.

(21) Appl. No.: 15/921,532

(22) Filed: Mar. 14, 2018

(51) Int. Cl.
*G06F 16/182* (2019.01)
*G06F 16/28* (2019.01)
*G06F 16/35* (2019.01)
*H04L 9/40* (2022.01)
*H04L 41/069* (2022.01)

(52) U.S. Cl.
CPC ........ *H04L 63/1425* (2013.01); *H04L 41/069* (2013.01)

(58) Field of Classification Search
CPC .. G06F 16/9535; G06F 40/284; G06F 16/285; G06F 16/35; G06F 16/24578; G06F 16/355; G06F 16/00; G06F 16/313; G06F 16/38; G06F 16/835; G06F 16/182; G06F 16/24575; G06F 16/248; G06F 16/335; H04L 63/1425; H04L 41/069
See application file for complete search history.

(56) References Cited

U.S. PATENT DOCUMENTS

| | | | |
|---|---|---|---|
| 5,867,799 A | 2/1999 | Lang et al. | |
| 6,751,614 B1* | 6/2004 | Rao | G06F 16/355 |
| 7,155,668 B2 | 12/2006 | Holland et al. | |
| 9,727,925 B2* | 8/2017 | Subramanian | G06F 16/951 |
| 2009/0004875 A1* | 1/2009 | Shen | G06F 16/285 |
| 2013/0218872 A1* | 8/2013 | Jehuda | G06F 16/335 |
| | | | 707/722 |
| 2014/0143543 A1* | 5/2014 | Aikas | G06F 16/252 |
| 2014/0181968 A1 | 6/2014 | Ge et al. | |
| 2015/0358292 A1* | 12/2015 | Karale | G06F 16/355 |
| 2016/0232160 A1* | 8/2016 | Buhrmann | G06F 16/248 |
| 2016/0371327 A1* | 12/2016 | Hoernicke | G06F 16/245 |

(Continued)

OTHER PUBLICATIONS

Choi, S.- S., "Correlation Analysis of Binary Similarity and Dissimilarity Measures," Doctoral Dissertation, Pace University, Jan. 1, 2008, 2 pages [Abstract Only].

(Continued)

*Primary Examiner* — Son T Hoang
(74) *Attorney, Agent, or Firm* — Davis Wright Tremaine LLP

(57) ABSTRACT

A computer system receives a set of messages, and processes the messages using a filter. In some examples, the filter is defined using a pattern matching language such as a regular expression. The system collects a set of representative messages that match the filter. Using the set of representative messages, the system generates a corresponding flow network graph. Using the flow network graph, the system determines a similarity measure that indicates whether a new message resembles other matching messages of the filter. Based on the similarity measure, in various embodiments, the system identifies potential errors in the filter definitions, omissions in the terms of the filter, and message outliers that indicate system anomalies or events of particular interest to the user.

20 Claims, 10 Drawing Sheets

(56) References Cited

U.S. PATENT DOCUMENTS

| | | | | |
|---|---|---|---|---|
| 2017/0083484 | A1* | 3/2017 | Patil | G06F 16/686 |
| 2019/0081963 | A1* | 3/2019 | Waghorn | G06F 16/9024 |
| 2019/0104169 | A1* | 4/2019 | Wu | H04L 67/10 |
| 2020/0067861 | A1* | 2/2020 | Leddy | H04L 51/12 |
| 2020/0311769 | A1* | 10/2020 | Sussman | G06F 16/835 |

OTHER PUBLICATIONS

Crocetti, G., "Textual Spatial Cosine Similarity," Proceedings of Student-Faculty Research Day, CSIS, Pace University, May 2, 2014, 4 pages.

Gerhards, R., "The Syslog Protocol," RFC 5424, Network Working Group, Internet Engineering Task Force [https://tools.ietf.org/html/rfc5424], Mar. 2009, 39 pages.

Hassan, S., "Measuring Semantic Relatedness Using Salient Encyclopedic Concepts," Doctoral Dissertation, University of North Texas, 2011, 110 pages.

Huang, A., "Similarity Measures of Text Document Clustering," Proceedings of the Sixth New Zealand Computer Science Research Student Conference (NZCSRSC 2008), Christchurch, New Zealand, 2010, pp. 49-56.

Jiang, J.J., et al., "Semantic Similarity Based on Corpus Statistics and Lexical Taxonomy," Proceedings of the International Conference on Research in Computational Linguistics (ROCLOMG X), Taipei, Aug. 1997, pp. 19-33.

Kimura, T., et al., "Network Failure Detection and Diagnosis by Analyzing Syslog and SNS Data: Applying Big Data Analysis to Network Operations," NTT Technical Review, vol. 11(11), Nov. 2013, 6 pages.

Liu, N., et al., "Learning Similarity Measures in Non-orthogonal Space," Proceedings of the Thirteenth ACM International Conference on Information and Knowledge Management (CIKM '04), Washington, D.C., Nov. 8-13, 2004, pp. 334-341.

Lonvick, C., "The BSD Syslog Protocol," RFC 3164, Network Working Group, Internet Engineering Task Force [https://tools.ietf.org/html/rfc3164], Aug. 2001, 30 pages.

Mihalcea, R., "CSCE 5290—Natural Language Processing," University of North Texas, 2011, 72 pages.

Potharaju, P, et al., "Juggling the Jigsaw: Towards Automated Problem Inference from Network Trouble Tickets," 10th USENIX Symposium on Networked Systems Design and Implementation (NSDI '13), 2013, pp. 127-141.

Vaarandi, R., "A Data Clustering Algorithm for Mining Patterns From Event Logs," 3rd IEEE Workshop on IP Operations and Management, 2003 (IPOM 2003), Oct. 3, 2003, pp. 119-126.

Zhang, J., "Visualization of Information Retrieval," The Information Retrieval Series (Book 23), Springer 2008, pp. 27-34 and 138-139.

* cited by examiner

ADAPTIVE DATA FILTERING SYSTEM

CROSS REFERENCE TO RELATED APPLICATION

This application incorporates by reference for all purposes the full disclosure of co-pending U.S. patent application Ser. No. 15/827,810, filed Nov. 30, 2017, entitled "SPATIAL COSINE SIMILARITY BASED ANOMALY DETECTION."

BACKGROUND

Many computing systems produce large amounts of data which must be analyzed and processed. In some systems this data is processed using user-configurable filters. Many filters are configured using a pattern matching language such as regular expressions. Regular expressions are very powerful and flexible, but regular expressions can be difficult for many users to configure correctly. In addition, because regular expressions define rigid sets of matching and non-matching records, the consequences of specifying an incorrect regular expression can result in significant errors in the output of the filter. Therefore, finding ways to detect, correct, and improve the performance of data filters is an important problem.

BRIEF DESCRIPTION OF THE DRAWINGS

Various techniques will be described with reference to the drawings, in which.

DETAILED DESCRIPTION

Figure 1:
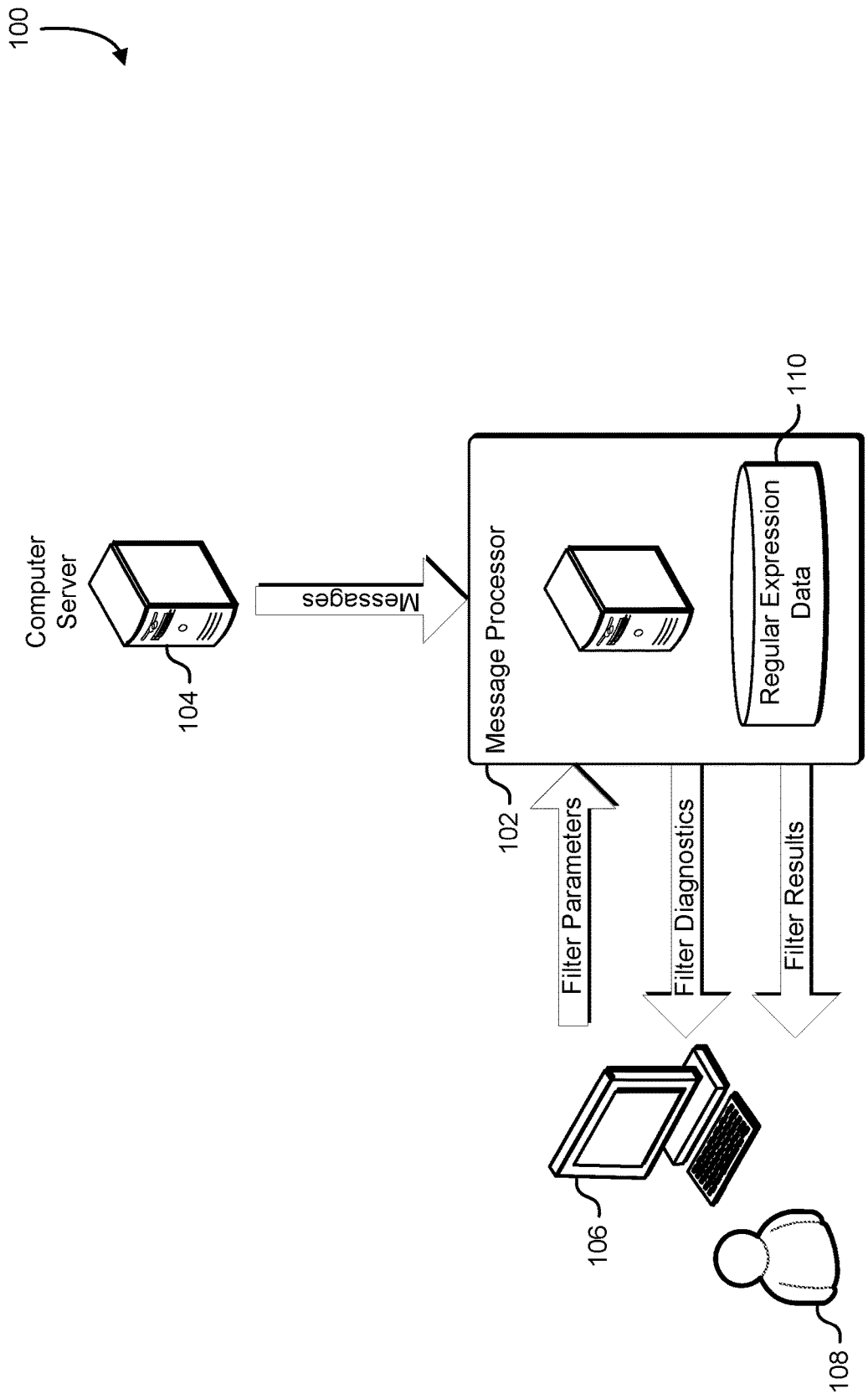
FIG. 1 illustrates a system that processes a stream of messages using filters specified by an administrator, and produces filter diagnostics that can be used to improve the accuracy of the specified filters, in an embodiment.

The present document describes a system and method that provides message filtering based at least in part on a set of search patterns specified by a user. For each search pattern in the set of search patterns, the system selects sample messages that match the search pattern and generates a flow network graph that represents the sample messages. Using the flow network graph, the system analyzes messages that do not match the search pattern to determine a measure of similarity to those that do match the search pattern. In an embodiment, the system identifies those messages that are sufficiently similar to other messages that do match the search pattern, and is able to suggest that the search pattern may need to be modified to match the similar message. In another embodiment, the system suggests the creation of new search patterns by identifying messages that are not close matches to any search pattern in the set of search patterns. In various embodiments, the level at which a particular message is considered a near match to a search pattern is adjustable by the user.

In various embodiments, a search pattern may be specified in the form of a regular expression. In an embodiment, a regular expression (also called a 'regex') is a way of defining a search pattern in a section of text. Regular expressions may be used in situations where it is important to identify, filter, isolate or retrieve specific groups of text. For example, regular expressions may be used for detecting anomalies in network and security logs of the computer system, but those skilled in the art will appreciate that regular expressions may be applied to many kinds of text messages. In some embodiments, regular expressions may be used to filter incoming system log messages in order to identify those messages that may be considered potentially anomalous.

A message processing system based on regular expressions can be very efficient and very powerful; however, the language that specifies a regular expression can be difficult to master, leading to human error. In general, regular expressions provide a search pattern that is very rigid, and therefore a regular expression will only provide an indication of whether a section of text matches or not. Therefore, in order to craft a correct regular expression for a particular category of messages, the person writing the regular expression usually needs a complete and correct understanding of the definition of the category of messages. For many systems, the stream of messages processed by the system can be large and evolving, making a perfect understanding of the definition of message categories very difficult.

The present document improves such systems by providing a system in which the matching of messages to a regular expression is able to occur with a relaxed standard. If a message does not match a regular expression, the system is able to determine a measure that indicates how close the message is to matching the regular expression. In some examples, when the system detects that a message is a close match or near match to a given regular expression, the system is able to suggest that the regular expression may be modified to include the detected message. In another example, when the system detects that a message is not a close match to any regular expression, the system suggests that a new regular expression be added to the message filtering system.

In one embodiment, the system determines the degree to which a message matches a regular expression as follows. In an embodiment, the system selects a set of sample messages that match the regular expression and uses the set of sample messages to generate a flow network graph representing the set of sample messages. The system identifies a specific path through the graph that represents the regular expression, and then makes a determination as to the degree to which a particular message matches the regular expression, based at least in part on the degree to which a particular message matches the identified path through the graph. In some implementations, the system analyzes the graph to determine a weight to apply to each node when making the determination. In this way, messages that resemble the samples messages will be identified as near or close matches to the regular expression.

In some implementations, the system may be used to dramatically improve the performance of a conventional regular-expression-based engine. In some examples, the system described herein can be used to check the similarity of a particular message to a sample set of messages that match the regular expression, thereby avoiding the necessity of evaluating each and every message against the regular expression itself. In another example, the system can replace conventional regex processing where 100% conformity to the regular expression is unnecessary. In another example, the system can be used to pre-process messages and identify a subset of the messages for processing with conventional regex processing.

In another example, the system provides improved log file analysis that can significantly improve the reliability and manageability of a computer system. When used to improve the processing of system logs, the system may provide dramatically improved accuracy in the detection of anomalies, more accurate anomaly detection as a result of improved regular expressions in the filter logic, reduction in the number of impactful events, and greater message processing capability.

FIG. 1 illustrates a system that processes a stream of messages using filters specified by an administrator, and produces filter diagnostics that can be used to improve the accuracy of the specified filters, in an embodiment. An example of a system 100 for filtering a stream of incoming messages is illustrated in FIG. 1. In an embodiment, the system 100 includes a message processor 102. In an embodiment, the message processor 102 is a computer system with a processor and memory for holding computer-executable instructions that, as a result of being executed, cause the computer system to receive messages from a computer server 104, process the messages in accordance with a set of filter parameters provided by the user 108 via a client computer system 106, and return a set of filter diagnostics and filter results to the client computer system 106. In various embodiments, the message processor 102 may be a computer server, computing appliance, embedded computer system, virtual computer system, computer service, execution runtime, or virtual computing service.

The computer server 104 provides the message processor 102 with messages to be processed. In various examples, the computer server 104 may be a network service, a security service, or a logging service. In an embodiment, the messages provided by the computer server 104 are log messages associated with various services provided by a computing resource service provider. In an embodiment, the messages provided by the computer server 104 are security messages provided by a network firewall or a network management service.

In an embodiment, the message processor 102 is provided with a set of filter parameters by the user 108. The user 108 enters the filter parameters using an interface provided by the client computer system 106. In an embodiment, the interface is a web browser, and the filter parameters are submitted to the message processor 102 via a web interface provided by the message processor 102. In an embodiment, the user 108 enters the filter parameters via a client application hosted by the client computer system 106, and the client application sends the filter parameters to the message processor 102. The client computer system 106 may send the filter parameters to the message processor 102 over a computer network, a USB connection, a serial connection, an infrared connection, or in some implementations, via physical media which is transferred between the client computer system 106 and the message processor 102.

The filter parameters specify a set of filters to be applied to the messages provided by the computer server 104. In some implementations, the filter parameters are specified as a set of regular expressions. In some implementations, the filter parameters are specified as a set of sample messages that match the desired pattern. Those skilled in the art will appreciate that filters may be specified using other pattern matching languages such as Backus-Naur Form ("BNF") or augmented BNF ("ABNF"). In various examples, the filter parameters may include additional parameters that allow the message processor 102 to categorize messages that, for a given filter specification, do not match the given filter specification but resemble other messages that do match the filter specification, as near matches. For example, the filter parameters may include a threshold similarity value that relaxes the interpretation of a particular filter by allowing nonmatching messages that are nonetheless similar to other matching messages to be considered as near matches or matches to the filter.

The message processor 102 stores the filter parameters in a regular expression data store 110. As messages are received from the computer server 104, the message processor 102 evaluates each message in accordance with each stored regular expression and determines whether each message is a match, or near match, for each stored regular expression. In some embodiments, if the message processor 102 identifies a message that does not match any of the stored regular expressions, but is a near match to a particular regular expression, the message processor 102 may indicate to the user 108 that the particular regular expression may be incorrect. In an implementation, the message processor 102 suggests that the particular regular expression be modified to include the message that is a near match. In some embodiments, if the message processor 102 identifies a message that does not match any of the stored regular expressions, and the message is not a near match to any of the stored regular expressions, the message processor 102 indicates to the user that a new regular expression should be added to the filter parameters to cover the message. By providing the filter diagnostics to the user 108 via the client computer system 106, the filter parameters may be improved over time, thereby increasing the accuracy of the results produced by the message processor 102.

Figure 2:
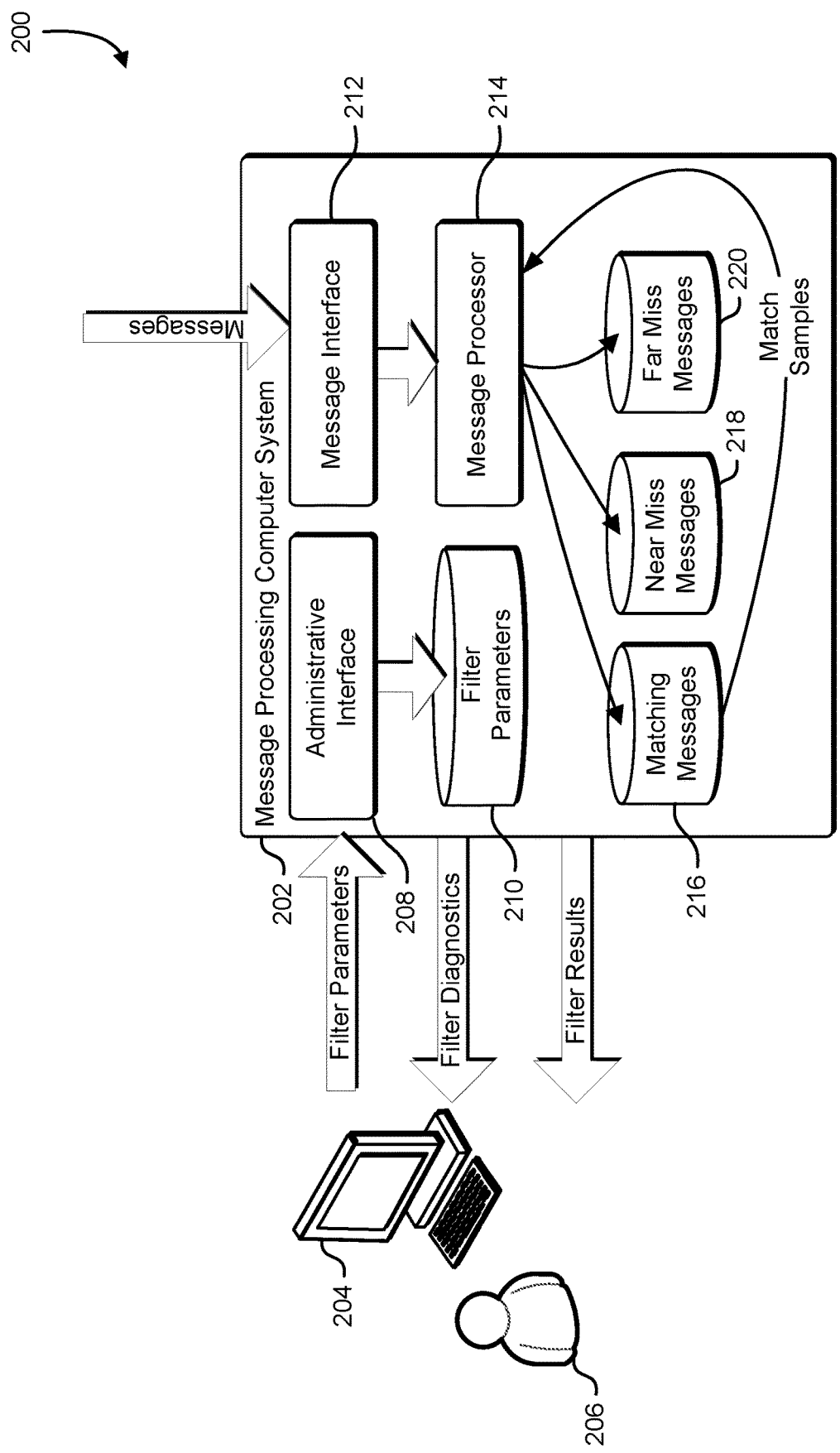
FIG. 2 illustrates a message processing computer system that uses regular expressions to categorize incoming messages, in an embodiment.

FIG. 2 illustrates a message processing computer system that uses regular expressions to categorize incoming messages, in an embodiment. A system 200 includes a message processing computer system 202 in which additional detail is illustrated. A client computer system 204 operated by a user 206 is used to submit a set of filter parameters to the message processing computer system 202. The filter parameters specify a set of filters to be applied to incoming messages, log entries, error messages, system logs, or other data. In some embodiments, each filter in the set of filters is specified using a pattern matching language such as a regular expression. Those skilled in the art will appreciate that each filter may be specified in a variety of ways such as by providing a set of matching examples. In an implementation, the client computer system 204 is, for example, a client computer system, computer server, cellular phone, tablet computer system, system management console, or network management console.

Communication between the client computer system 204 and the message processing computer system 202 is facilitated by an administrative interface 208. The administrative interface 208 receives the filter parameters from the client computer system 204. In some embodiments, the administrative interface 208 is a web interface that listens on a network port of a network interface that is connected to the message processing computer system 202. In an embodiment, the filter parameters are transmitted to the message processing computer system 202 from a web browser or web application running on the client computer system 204 over a hypertext transport protocol ("HTTP") or secure hypertext transport protocol ("HTTPS") connection. In some embodiments, the client computer system 204 is integrated into the message processing computer system 202. For Example, the user may enter the filter parameters using a keyboard and display unit that are connected to the message processing computer system 202 by dedicated electrical interfaces such as a USB interface for the keyboard and an HDMI interface for the display unit. In such examples, client software on the message processing computer system 202 may take the place of a client application or web browser on the client computer system 204. The filter parameters are stored by the message processing computer system 202 and a filter parameter store 210. The filter parameter store 210 may be a database, linked list, array, tree, hash table, or other data structure that is stored on a memory accessible to the message processing computer system 202.

In an embodiment, messages are acquired by the message processing computer system 202 at a message interface 212. In some examples, the message interface is a web interface, network interface, functional interface, or remote procedure call that is accessible to one or more message sources. A message source may be a computer service provided by a computing resource service provider, a computing device, an online service, a network monitor, a network firewall, the security monitoring device or service, or a computer system that generates diagnostic messages.

The message processing computer system 202 applies the filter specified by the filter parameters to each message received by the message interface 212 using a message processor 214. The message processor 214, in an embodiment, is a pattern matching engine comprised of executable instructions stored on memory that, if executed by the message processing computer system 202, read the filter parameters from the filter parameter store 210 and determine whether each message matches one or more of the specified filters. In one example, the message processor 214 is a regular expression engine, and the filter parameter store 210 includes a set of regular expressions specified by the user 206. The message processor 214 categorizes each message as a near miss, a far miss, or a matching message. If the message matches a particular filter specified by the filter parameters, the message is stored, in association with a particular filter matched, in a store of matching messages 216.

If the message does not match any of the specified filters, the message processor 214 determines a measure of how close to matching any of the specified filters the message is. In an embodiment, for each specified filter in the set of filter parameters, the message processor 214 acquires a set of sample messages that match the specified filter. In some examples, the message processor 214 retrieves a sample of matching messages from the matching messages store 216. In another example, the message processor 214 is provided with sample matching messages as part of the filter parameters provided by the user 206. Using the sample matching messages, the message processor 214 generates a flow network graph for each filter and identifies a path that represents the regular expression. Nonmatching messages are compared to the path to determine a measure of similarity between the nonmatching message and messages that match the regular expression. The measure is compared to a threshold provided by an administrator that determines whether the nonmatching message is similar enough to matching messages to be categorized as a near miss.

In an embodiment, the message processing computer system compares the nonmatching messages against the path identified in the flow network graph by comparing the value of each token of the message with the corresponding node in the graph. In some embodiments, the similarity between the message and the identified path is determined using spatial co-sine similarity. The resulting similarity value ranges from 0 to 1, and if the similarity value is above the threshold specified by user or system administrator, the message processing computer system determines that the message is very close to the sample messages, and that the message is similar to the message represented by the graph. Since the graph is related to a particular filter, it can be inferred that the message is similar to messages usually caught by the particular filter.

Messages that are categorized as a near miss are stored in a near miss messages store 218 in association with the filter they are near miss of. For messages that are not a match of any filter, and are also not a near miss of any filter, the message processor 214 stores such messages in a far miss messages store 220. The set of matching messages, the set of near miss messages, and the set of far miss messages may be provided to the user 206 is a set of filter results via the client computer system 204.

In an embodiment, the message processing computer system 202 provides a set of filter diagnostics to the user 206 by the client computer system 204. In one example, for each near miss message in the near miss messages store 218, the message processing computer system 202 provides a diagnostic indicating that the filter specification associated with the near miss message may be incorrect and should be modified to cover the near miss message. In another example, for each far miss message in the far miss messages store 220, the message processing computer system 202 provides a diagnostic message to the user 206 indicating that a filter may need to be added to the set of filter parameters that matches the far miss message. In another example, far miss messages may be identified as system anomalies that should be given particular attention by the user 206.

Figure 3:
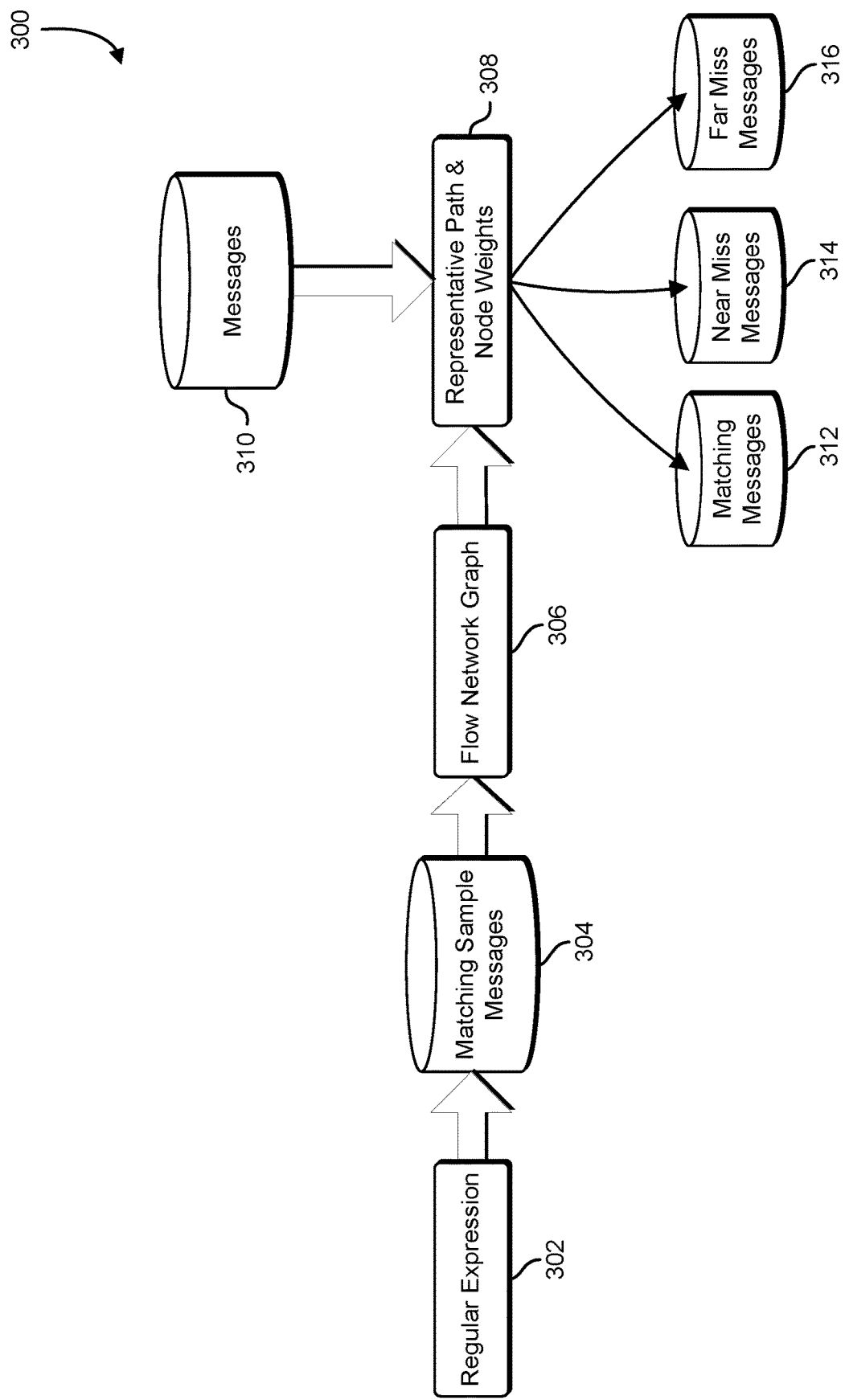
FIG. 3 illustrates a data flow that processes messages using relaxed regular expressions, in an embodiment.

FIG. 3 illustrates a data flow that processes messages using relaxed regular expressions, in an embodiment. In an embodiment, an information diagram 300 illustrates the information maintained by a message processing computer system. The message processing computer system maintains a set of filter specifications. In the example illustrated in FIG. 3, an example filter is specified as a regular expression 302. For each filter specification, the message processing computer system acquires a set of sample messages that match the particular filter. For the regular expression 302, the message processing computer system acquires a set of matching sample messages 304. In some implementations, the set of matching sample messages is acquired as the message processing computer system identifies incoming messages that match the regular expression 302. In another implementation, the set of matching sample messages is sampled from incoming matching messages over time. In yet another implementation, the set of matching sample messages is provided by an administrator or user along with the regular expression 302.

After receiving a threshold number of matching messages, the message processing computer system builds a flow network graph 306 that represents the sample messages. The threshold number of matching messages may be determined based on the number of tokens in each message and the number of unique tokens at each position of the matching messages. For example, for matching messages having an average of 8 tokens per message, and each token having an average of 3 different values, the threshold number of messages could be set to 24. In another example, the threshold number of messages may be determined by estimating the number of messages required to obtain a representative set of matching messages, such as 100 matching messages. A flow network graph is a variation of a directed acyclic graph ("DAG"). The flow network graph includes a set of vertices and a collection of directed edges. Each edge of the flow network graph connects an ordered pair of vertices. Because the edge has an associated direction, the edges point from the first vertex in the pair to the second vertex in the pair. In an embodiment, a flow network graph is a directed acyclic graph that includes a source node s and a sink node t. Each node in the flow network graph has a level attribute, a value attribute, and a weight attribute. The level attribute is the graph depth of the node. For example, the source node of a flow network graph is 1. The value of a flow network graph is used to store a message token that represents a linguistic unit for the message. In some implementations, the value of a flow network graph node is a word or token parsed from incoming message. In another implementation, the value of a flow network graph node is associated with a token extracted from a value sequence. In some examples, tokens may be separated by a set of delimiters. In other examples, token boundaries may be established by determining field lengths. In an embodiment, messages may be in the form of value sequences such as strings, byte sequences, Unicode character sequences, or block data. The weight of a node represents how many times a flow has passed through the node. For example, a flow network graph with 10 flows that has a common node through which all flows flow would have a weight of 10. The message processing computer system retains a representative path and node weights 308 for each flow network graph.

Next, the message processing computer system identifies a flow through the flow network graph that represents the filter. In one example, the message processing computer system determines a score for each path through the graph by summing the weight of each node in the path and then dividing the result by the length of the path. The path with the highest score is selected as the path that represents the regular expression (as indicated by the matching sample messages).

The message processing computer system evaluates incoming messages against the path identified in the flow network graph. In some embodiments, the similarity between the message and the identified path is determined using spatial co-sine similarity. The resulting similarity value ranges from 0 to 1, and if the similarity value is above the threshold specified by user or system administrator, the message processing computer system determines that the message is very close to the sample messages, and that the message is similar to the message represented by the graph. Since the graph is related to a particular filter, it can be inferred that the message is similar to messages usually caught by the particular filter.

Using the above data flow, the message processing computer system processes each message from a set of messages 310 provided from the message source such as a computing service, computing device, or log-generating system. As a result of processing the messages, the system divides the messages into a set of matching messages 312 that match one or more filters, a set of near-miss messages 314 that are similar to messages that match one of the filters (a near miss), and messages that neither match any filter nor are they similar to messages that match any filter (far misses).

Figure 4:
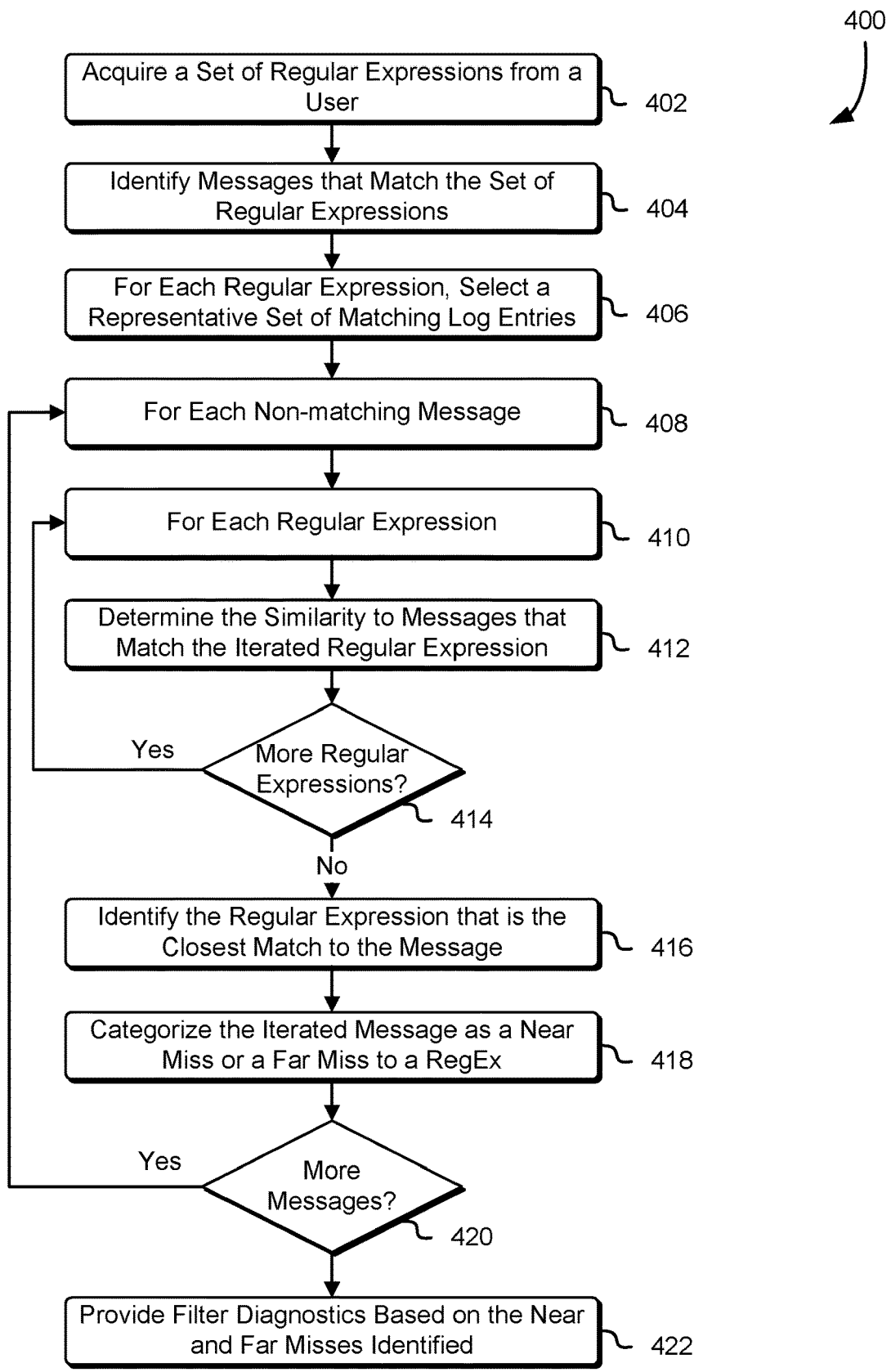
FIG. 4 illustrates a process that, as a result of being performed by a message processing computer system, provides information related to the performance of a regular expression, in an embodiment.

FIG. 4 illustrates a process that, as a result of being performed by a message processing computer system, provides information related to the performance of a regular expression, in an embodiment. A flowchart illustrates a process 400 that begins at block 402 with a message processing computer system acquiring a set of filter specifications in the form of a set of regular expressions from user. In some implementations, the filters may be specified in another pattern-matching language. In another implementation, the filters may be specified by providing one or more sample messages that match the filter. At block 404, the message processing computer system processes the set of incoming messages and identifies those messages that match at least one of the regular expressions.

At block 406, the message processing computer system initiates a loop that iterates over each regular expression, and determines for each iterated regular expression, a set of messages that matches the iterated regular expression (or other pattern-matching language) to be used as a representative sample of matching messages for the iterated regular expression. In some implementations, the set of matching messages is provided directly from the user to an association with the regular expression. In an embodiment, additional messages are added to the set of messages as new matching messages are received by the message processing computer system. In some examples, all the messages that match a particular regular expression are used as representative messages. In another example, the first of a set number of messages that match the particular regular expression is defined as the representative sample for the regular expression. The message processing computer system uses the set of representative messages to create a flow network graph for each regular expression.

For each message that does not match any of the regular expressions, the message-processing computer system determines whether the nonmatching message is a near match to any of the regular expressions. At block 408, the message processing computer system initiates a loop that iterates over each message that does not match at least one regular expression. At block 410, the message processing computer system initiates a loop that iterates over each regular expression. At block 412, within both loops, the message processing computer system determines the similarity between the iterated message and the representative messages associated with the iterated regular expression. In some implementations, the similarities are determined as described above with respect to FIG. 3. Other methods for determining the similarity between the iterated message and the representative messages associated with the iterated regular expression are described elsewhere in this document. At decision block 414, the message processing computer system determines whether there are more regular expressions to be iterated. If there are more regular expressions to be iterated, execution returns to block 410 and the next regular expression is processed. If there are not more regular expressions to be iterated, execution advances to block 416.

At block 416, the message processing computer system examines the similarity of the iterated message to each of the regular expressions, and identifies the regular expression to which the iterated message is the closest match. In an example, the closest match is determined as the regular expression having the greatest similarity measure (as determined using the flow network graph) for the iterated message. At block 418, the message processing computer system categorizes the iterated message as either a near miss or a far miss with respect to the identified closest regular expression. In one example, a near miss is determined when the similarity between the message and the closest regular expression exceeds a threshold level set by an administrator or user. A far miss is determined when the similarity between the message and the closest regular expression does not exceed the threshold level.

At decision block 420, the message processing computer system determines whether there are more messages to process. If there are more messages to process, execution returns to block 408 and the next nonmatching message is processed. If there are not more messages to process, execution advances to block 422. At block 422, the message processing computer system provides filter diagnostics based on the near and far miss messages that were identified above. For each near-miss message, the message processing computer system recommends that the associated regular expression be modified to cover the near-miss message. For each far-miss message, the message processing computer system recommends that a new regular expression be defined by the user for use in the system. In some embodiments, the message processing computer system flags far-miss messages as potential system anomalies that should be analyzed by the user.

Figure 5:
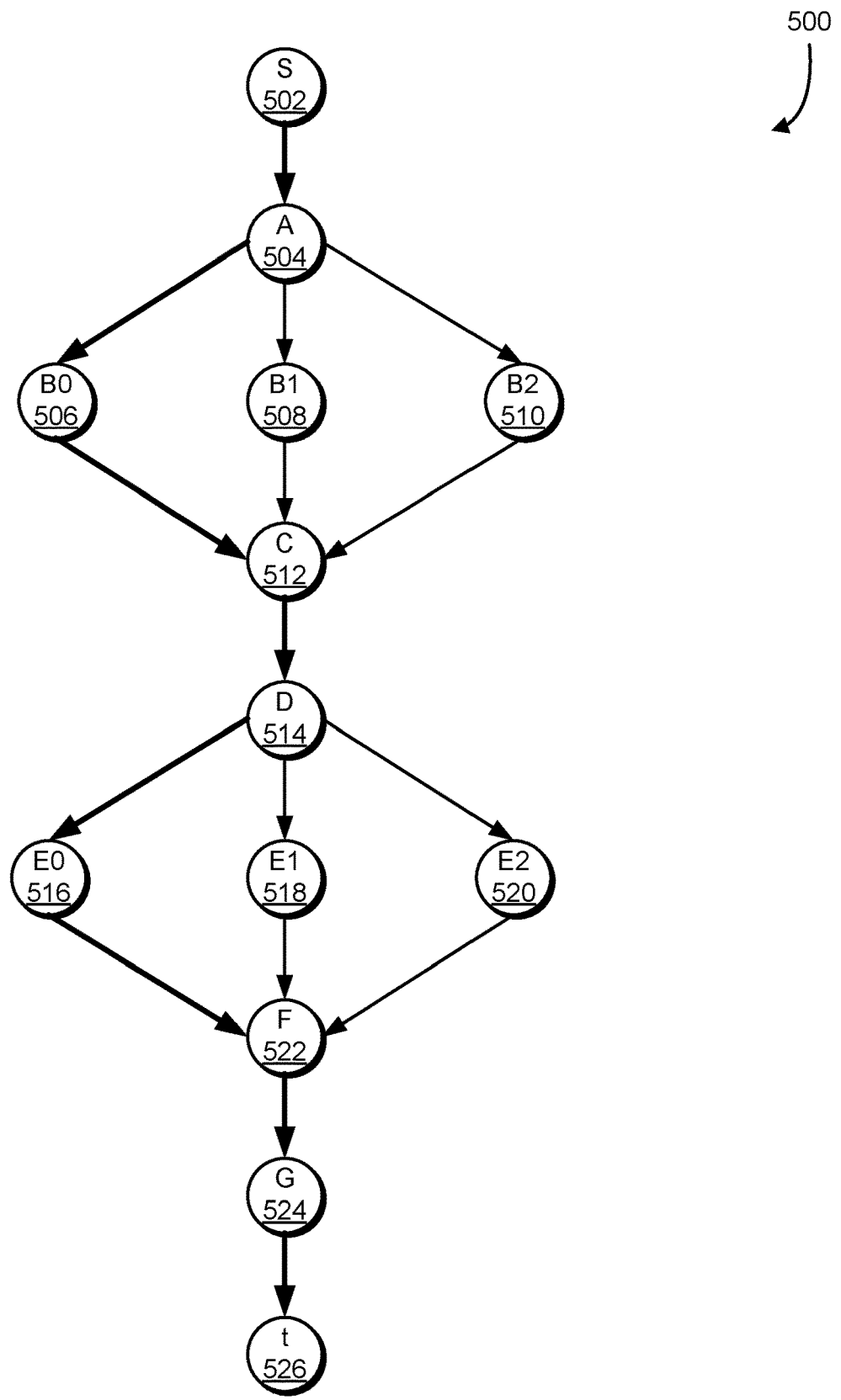
FIG. 5 illustrates a flow network graph for a set of message samples that match a regular expression, in an embodiment.

FIG. 5 illustrates a flow network graph 500 for a set of message samples that match a regular expression, in an embodiment. The flow network graph begins at a start node 502 (*s*). The flow network graph has seven intermediate levels A-G. Each intermediate level represents the position of a word or a token in a representative message for a particular filter (often defined by regular expression). Since the flow network graph has seven intermediate levels, the messages in the set of representative messages have seven tokens. There is only one alternative for the first position in each message represented by the first node 504. For the second position, there are three possible tokens represented by three level two nodes 506, 508, and 510. For the third and fourth positions, the representative messages each have two tokens represented by a third node 512 and a forth node 514 respectively. For the fifth position, the representative messages have three alternative tokens represented by nodes 516, 518, and 520. For the sixth and seventh positions, the representative messages all have the same two tokens represented by node 522 and node 524 respectively. The flow network graph 500 includes an end node 526.

After constructing the flow network graph in accordance with the set of representative messages, the message processing system establishes the weight for each node based on the number of times each path is traversed. For example, in the example shown in FIG. 5, nodes 504, 512, 514, 522, and 524 each have a weight of one (or the maximum weight) because all of the representative messages contain the same tokens at those respective positions. The weights of nodes 506, 508, and 510 are determined based on the number of times each node is present in a representative message. For example, if the token represented by node 506 is present in five of the representative messages, and the tokens represented by nodes 508 and 510 are present in only one of the representative messages each, then node 506 has a weight that is five times greater than nodes 508 or 510. When determining the weight of each node, in an embodiment, the weight values are normalized to the value between 0 and 1.

Using the weights of each node as determined above, the message processing system identifies a path to represent the set of representative messages. In one example, the path is selected by selecting the nodes with the highest weights. In another example, each path through the graph is analyzed and the path having the highest weight is chosen. In the example illustrated in FIG. 5, the chosen path is illustrated with the highlighted arrows through nodes 504, 506, 512, 514, 516, 522, and 524. After determining the path through the graph that best represents the representative messages, other messages are analyzed using the graph to determine their similarity to the set of representative matching messages. In some implementations, the similarities are determined using spatial co-sine similarity.

Figure 6:
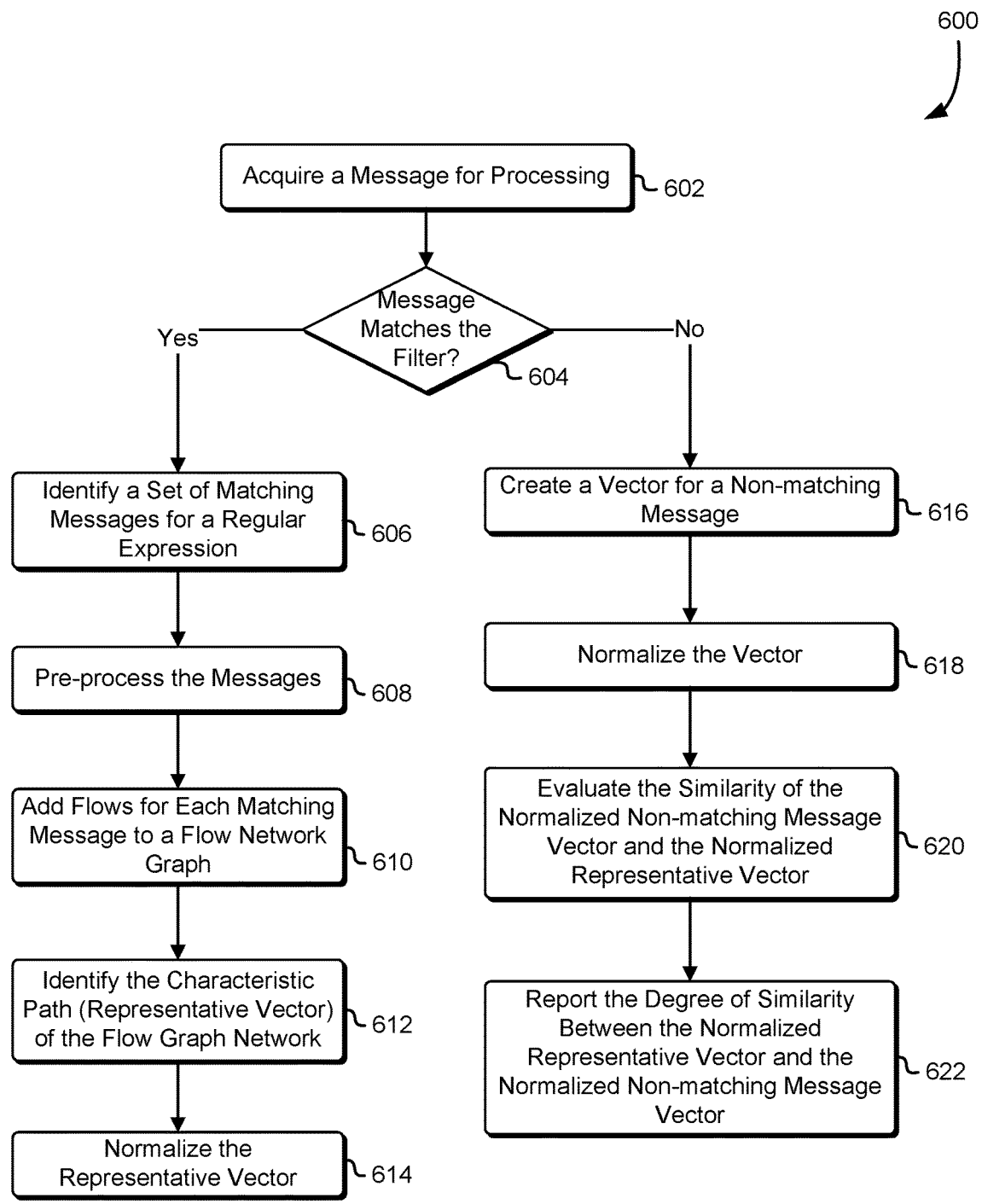
FIG. 6 illustrates a process that, as a result of being performed by a message processing computer system, determines the similarity of a message to a set of sample messages that match a regular expression, in an embodiment.

FIG. 6 illustrates a process that, as a result of being performed by a message processing computer system, processes an incoming message in accordance with a filter, in an embodiment. A process 600 begins at block 602 with a message processing computer system acquiring a message to be processed. In various examples, the message may be a log message, an error message, or trace message produced by a computer system or application program. At decision block 604, the system determines whether the message matches the filter or not. If the message matches the filter, execution advances to block 606. If the message does not match the filter, execution advances to block 616.

At block 606, a message processing computer system identifies a set of representative matching messages for a particular regular expression. In some examples, the set of representative matching messages is provided by the user with a regular expression. In another example, the set of representative matching messages is provided in lieu of a pattern-matching specification for a filter.

In some embodiments, at block 608, the message processing computer system performs preprocessing on the representative messages to remove timestamps, parameter values, or other highly variable tokens that are not consistent across the set of representative messages. By removing known inconsistent tokens such as timestamps, dates, network adapter names, and identifiers, the resulting flow network graph may be simpler and better represent the set of representative messages.

At block 610, the message processing computer system adds nodes and edges to a flow network graph for each representative message. As the flow network graph is constructed, the message processing computer system determines the number of times each node is traversed so that the node weight can be determined. The message processing computer system uses the node weights to identify the characteristic path through the flow network graph.

At block 612, the message processing computer system identifies a representative vector for the non-matching message based on an identified characteristic path through the flow graph network. In one implementation, the representative vector is generated by tokenizing the non-matching message and traversing the flow network graph using the values of each node. At block 614, the message processing computer system normalizes the representative vector to the same scale used to normalize the weights of the nodes in the flow network graph. In one example, the representative vector is normalized to a range of 0 to 1.

In some embodiments, the representative vector is determined during a learning phase of operation, and once the representative vector is established, the representative vector remains unchanged for the remainder of processing. In some examples, updating the representative vector is performed when computing resources are available, and bypassed when computing resources are not available. In some examples, the learning phase is performed until a particular number of matching messages have been processed. In yet another example, the learning phase may be performed until a threshold number of matching messages are processed without a change in the representative vector, at which point learning mode is disabled, and no further updates to the representative vector occur.

If the message does not match the filter, execution proceeds from block 616, at block 616, the message processing computer system generates a vector that represents the non-matching message. At block 618, the vector is normalized in a way that matches the normalization process of the representative vector. At block 620, the normalized vector is compared to the normalized representative vector to determine the similarity of the non-matching message to the representative matches used to generate the flow graph network. In an embodiment, this is used to infer how close the message is to matching the filter. At block 622, the message processing computer system reports the degree of similarity between the normalized representative vector and the normalized vector of the message. In some embodiments, the message processing computer system uses this information to suggest changes to the regular expression or to suggest the addition of a new regular expression to the set of filters used to configure the message processing computer system.

Figure 7:
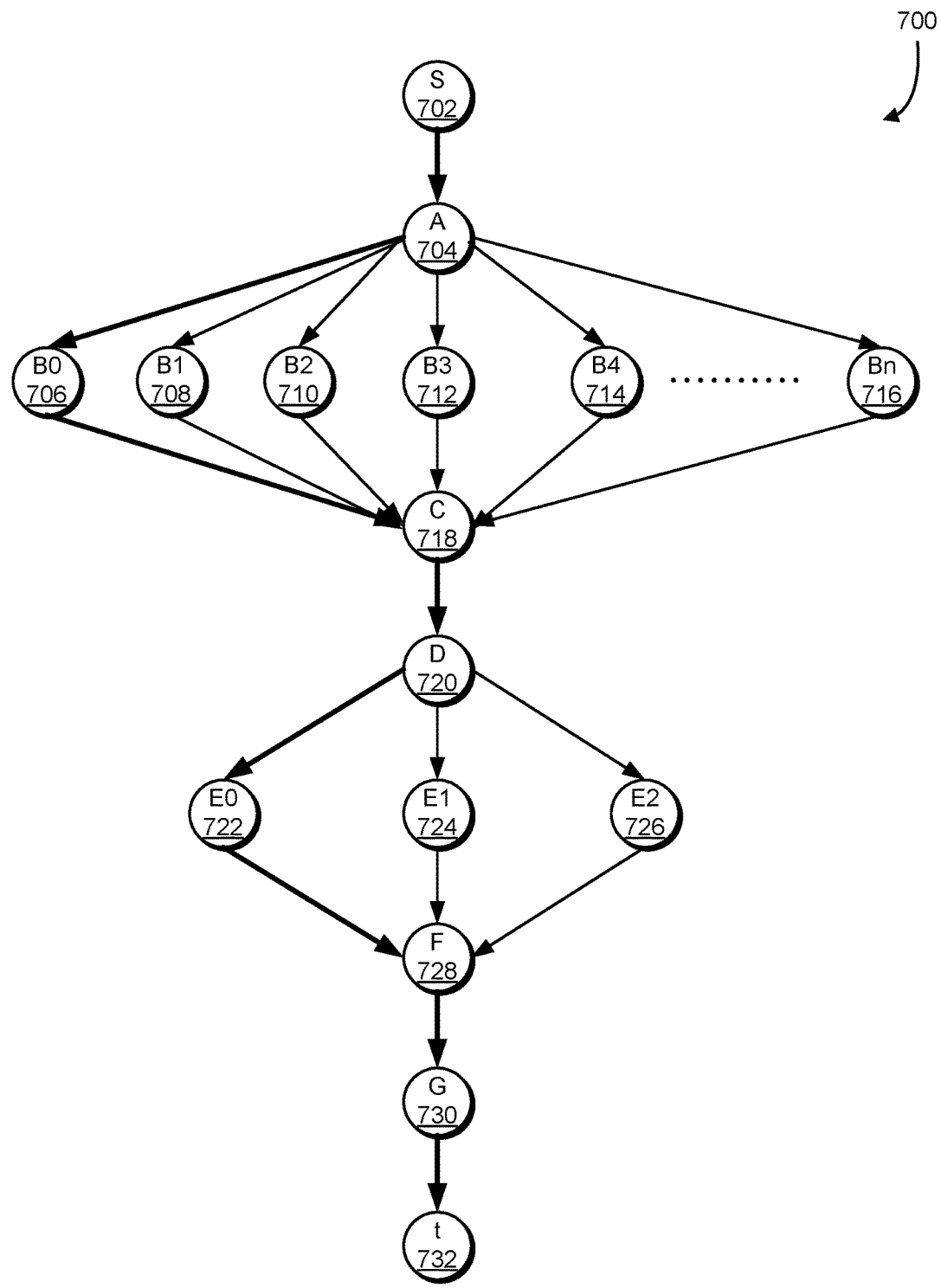
FIG. 7 illustrates a flow network graph for a set of message samples where the flow network graph includes a large number of nodes at the second level of the path.

FIG. 7 illustrates a flow network graph 700 for a set of message samples where the flow network graph includes a blob at the second level of the path, in an embodiment. The flow network graph begins at a start node 702 (*s*). The flow network graph has seven intermediate levels A-G. Each intermediate level represents the position of a word or a token in a representative message for a particular filter (often defined by a regular expression). In this example, since the flow network graph has seven intermediate levels, the messages in the set of representative messages have seven tokens. There is one alternative for the first position in each message represented by the first node 704. For the second position, there are many possible tokens represented by many level two nodes 706, 708, 710, 712, 714, and 716 (others not shown). For the third and fourth positions, the representative messages each have two tokens represented by a third node 718 and a forth node 720, respectively. For the fifth position, the representative messages have three alternative tokens represented by nodes 722, 724, and 726. For the sixth and seventh positions, the representative messages all have the same two tokens represented by node 728 and node 730, respectively. The flow network graph 700 includes an end node 732.

After constructing the flow network graph in accordance with the set of representative messages, the message processing system establishes the weight for each node based on the number of times each path is traversed. For example, in the example shown in FIG. 7, nodes 704, 718, 720, 728, and 730 each have a weight of one (or the maximum weight) because all of the representative messages contain the same tokens at those respective positions. The weights of the nodes at level two, 706, 708, 710, 712, 714, and 716, are determined based on the number of times each node is present in a representative message. In some situations, there can be fields within the set of representative messages that are highly variable, such as timestamps. In such situations, a large number of nodes will be present in the flow network graph at the corresponding level. When this occurs, it creates a blob in the graph as illustrated at level two of the flow network graph 700.

In some examples, the presence of a blob in the flow network graph is addressed by greatly reducing the weight of 42 tokens at that level of the graph. Weights are reduced when blobs occur because the weight of a particular token is divided by the total number of flows. When there is a large number of flows a given level, the weight accorded to tokens at that level is reduced. In another implementation, the system determines a threshold level of flows, and when the number of flows exceeds the threshold level, tokens at that level are ignored when determining the similarity measure. In some examples, the threshold measure is determined as a percentage of the total number of representative sample messages used to generate the flow network graph.

Figure 8:
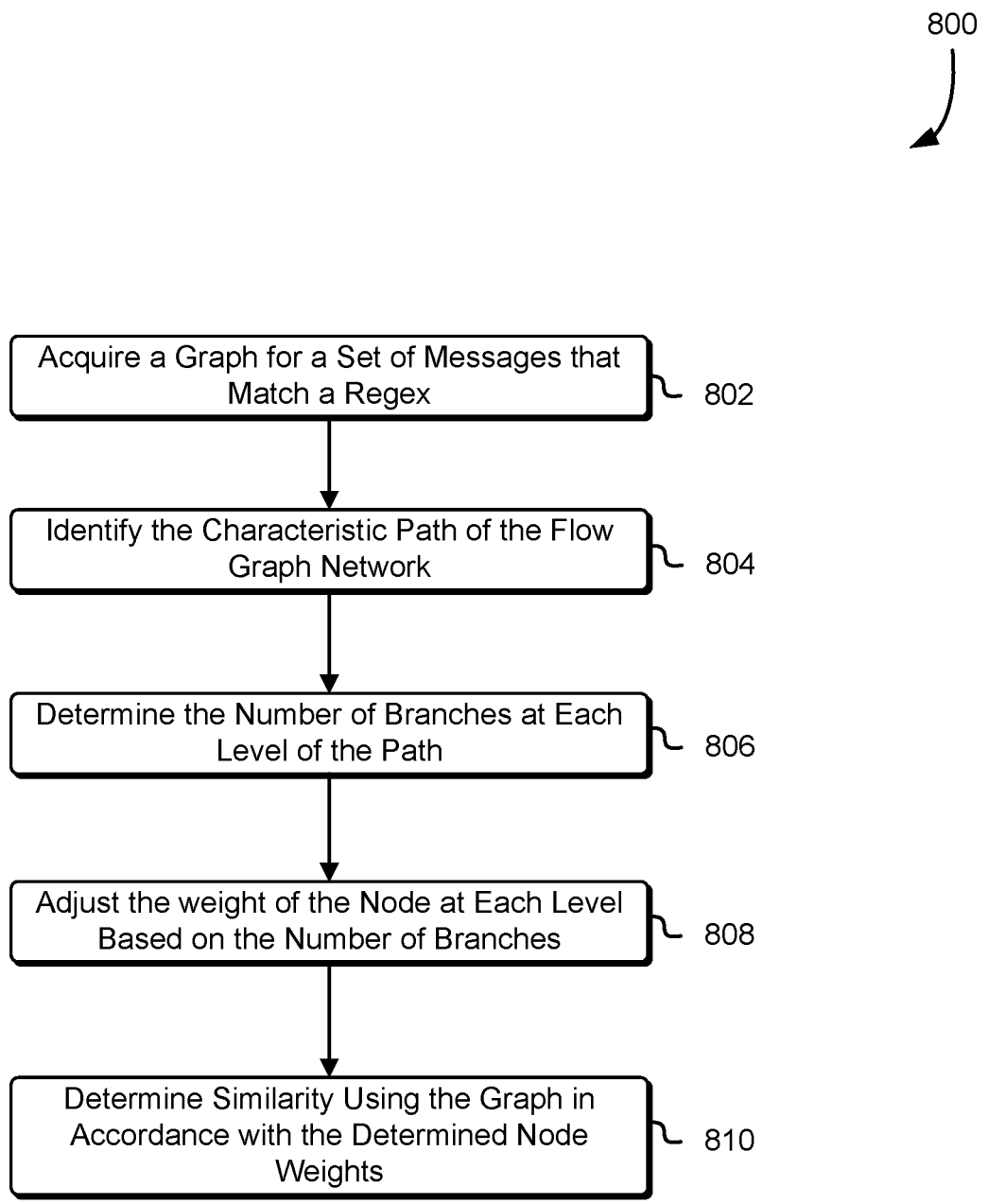
FIG. 8 illustrates a process that, as a result of being performed by a message processing computer system, adjusts the weight of nodes in a flow network graph based at least in part on the presence of blobs in the graph, in an embodiment.

FIG. 8 illustrates a process that, as a result of being performed by a message processing computer system, adjusts the weight of nodes in a flow network graph based at least in part on the presence of blobs in the graph, in an embodiment. A process 800 begins at block 802 with a message processing computer system acquiring a flow network graph for a set of representative messages that matches a filter. In some examples, the pattern-matching filter is defined using regular expression or other pattern-matching language. In an embodiment, at block 804, the message processing computer system identifies a characteristic path through the flow network graph based at least in part on the number of times each node in the flow network graph is represented by a message. In an example, the characteristic path is chosen as the path from the start node to the end node that, when the values of each node in the path are summed, results in the largest score.

In an embodiment, at block 806, the message processing computer system determines a number of branches for each level of the graph. In general, levels having a higher number of branches are caused by a corresponding large number of possible tokens at a corresponding position within the set of representative messages. For example, if the representative messages include a timestamp, and the representative messages are collected over time, the timestamp field may be different for each message. As a result, at the corresponding level in the flow network graph, there will be a large number of possible nodes or branches.

At block 808, the message processing computer system adjusts the weight of each node in the characteristic path to account for the number of nodes or branches at each level. For example, if a blob of nodes is present at a particular level, the weight given to the corresponding node in the characteristic path will tend to be much lower. In one example, the weight given to a node in the characteristic path is the number of messages in the set of representative messages where the particular node is present divided by the total number of messages. In another example, the message processing system compares the total number of nodes at a particular level to a threshold value that is configurable by an administrator, and if the number of nodes at a particular level exceeds the threshold value, the weight of the corresponding node in the path is set to zero. For example, the administrator may configure the system such that if there are more than 20 possible nodes at a given level, the weight of the node in the characteristic path is zero.

At block 810, the message processing computer system determines the similarity of a nonmatching message using the graph and the characteristic path using the adjusted node weights. By adjusting the weights of each node in this way, the impact of an inconsistent or highly variable token at a particular position within a message has a reduced effect, and the accuracy of the similarity measurement is improved.

Figure 9:
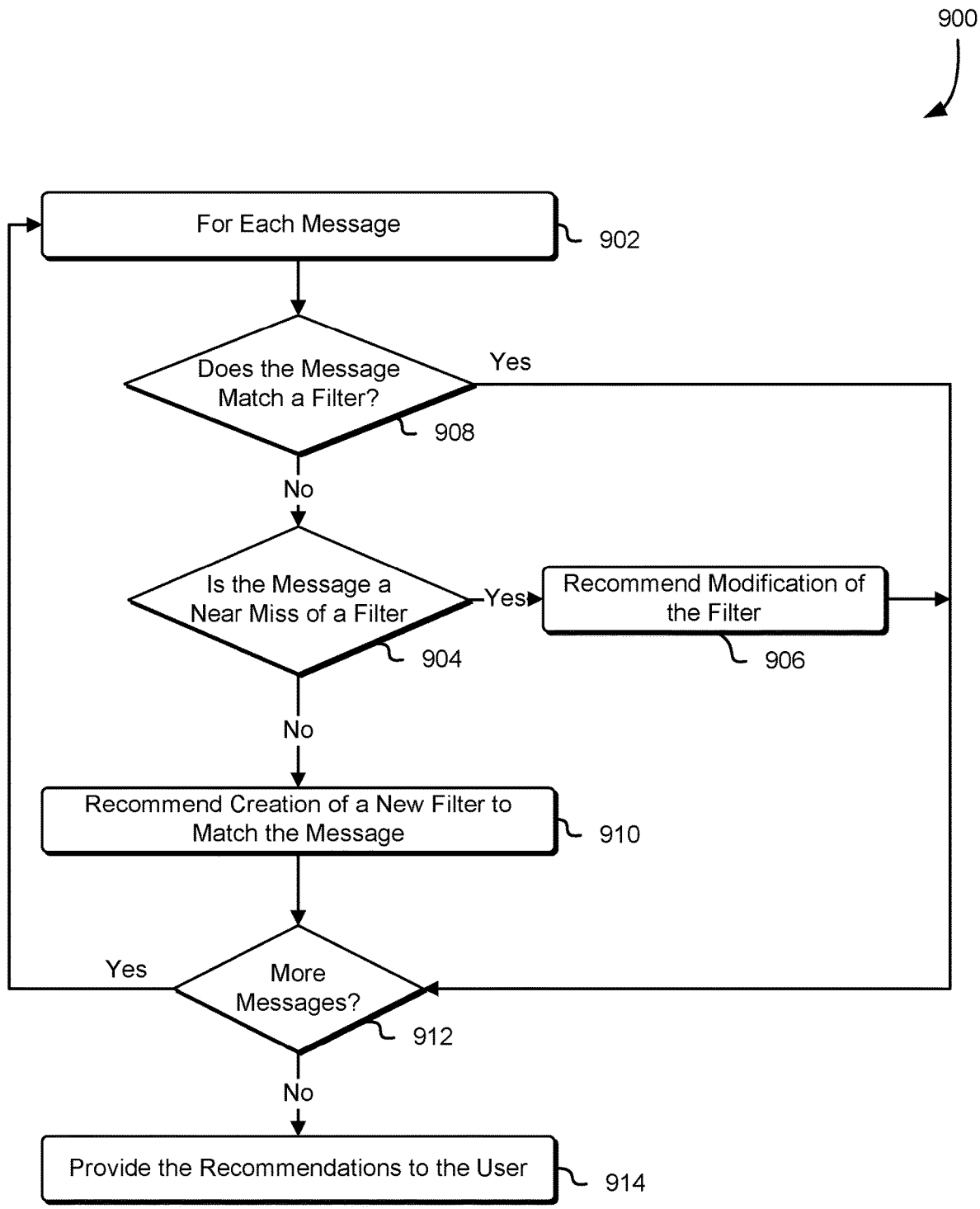
FIG. 9 illustrates a process that, as a result of being performed by a message processing computer system, generates recommendations for improving a set of regular expressions, in an embodiment.

FIG. 9 illustrates a process that, as a result of being performed by a message processing computer system, generates recommendations for improving a set of regular expressions, in an embodiment. In an embodiment, a process 900 begins at block 902 with a message processing computer system initiating a loop that iterates over each message received by the system for processing. In some examples, the messages are diagnostic messages generated by a computer system, computer service, network appliance, network firewall, or security device.

The message processing computer system processes the incoming messages in accordance with a set of filters. In some examples, the filters are specified by a set of regular expressions. In an embodiment, at decision block 908, the message processing computer system determines whether the iterated message matches at least one of the filters in the set of filters. If the iterated message matches at least one filter, execution advances to decision block 912. If the iterated message does not match any of the filters, execution advances to decision block 904.

At decision block 904, the message processing computer system determines whether the iterated message is similar to other messages that match at least one filter. In an example, the message processing computer system determines whether the iterated message nearly matches or almost matches at least one of the filters. If the message processing computer system determines that the iterated message is similar to other messages that match at least one filter, the message processing computer system generates a recommendation at block 906 which suggests that the at least one filter be modified to include the iterated message. In some embodiments, the message processing computer system identifies the particular filter to which the message is the closest match, and suggests modification of the particular filter. In another embodiment, the message processing computer system identifies one or more filters to which the message is sufficiently similar, and suggests modification of the identified filters.

If the message processing computer system determines that the iterated message is not similar to any of the messages that match at least one filter, execution advances to block 910. At block 910, the message processing computer system recommends the creation of a new filter to match the iterated message. In some examples, the message processing computer system infers that the iterated message is an outlier, and flags the message for special attention by the user or administrator. In one example, the messages are diagnostic messages provided by a computer system, and messages that do not match and do not nearly match any filter highlighted by the system as messages of particular significance.

In an embodiment, at block 914, the message processing computer system provides the recommendations identified throughout the process to the user. In some implementations, the recommendations are provided in the form of a report that is transmitted from a Web server implemented on the message processing computer system to a web browser running on a client computer system operated by the user. In one example, the message processing computer system generates a report with the recommendations, and transmits the report in the form of an email, text message, or hardcopy report.

Figure 10:
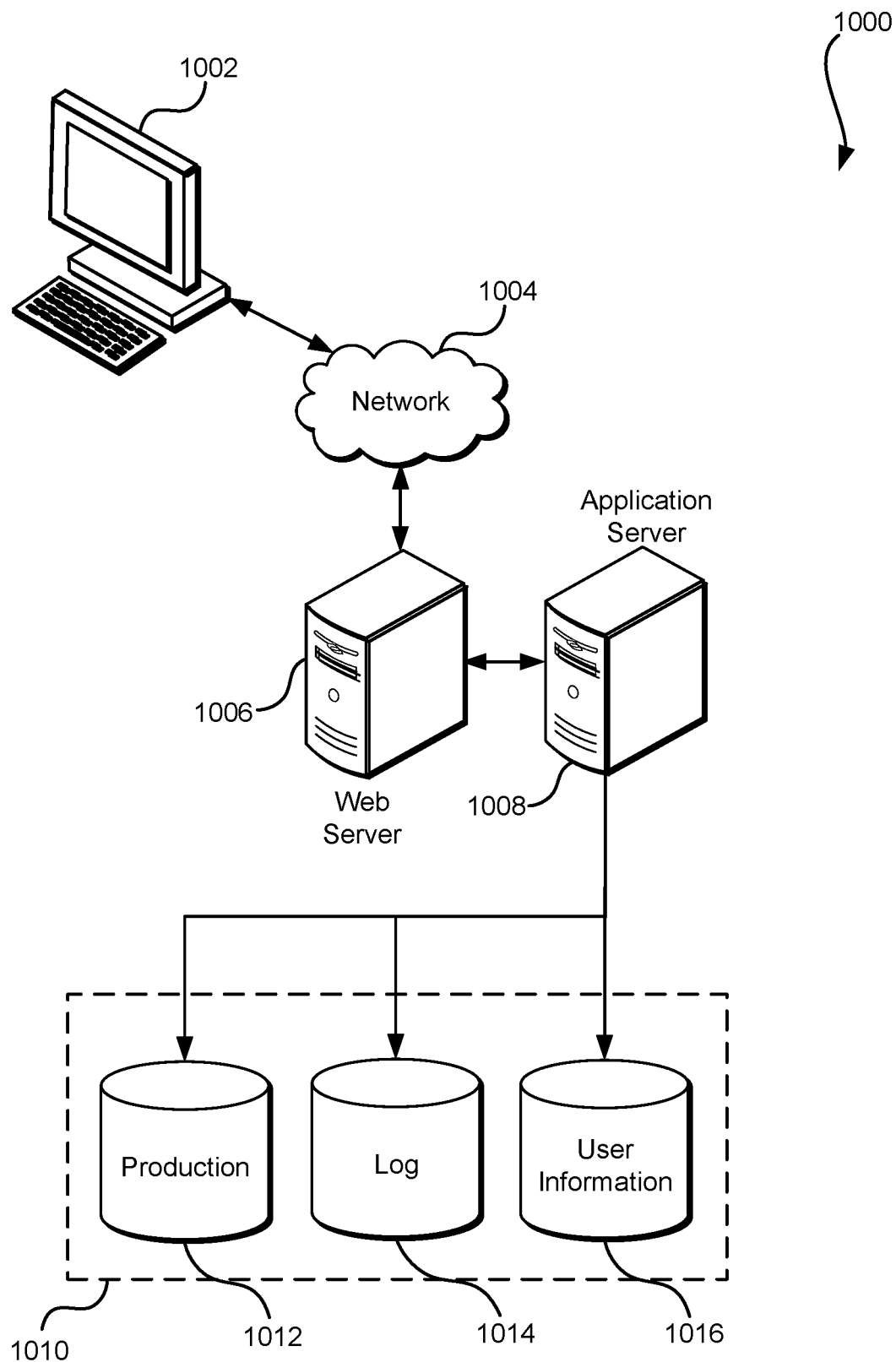
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network, and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
   acquiring a set of messages that match a filter in a set of filters, each filter in the set of filters defined by a regular expression;
   generating a flow network from the set of messages, each message in the set of messages represented by a path through the flow network, and each node in the flow network representing one or more tokens of one or more messages;
   receiving a new message that does not match the filter;
   determining, using the flow network, a similarity measure that indicates a similarity between the new message and at least one message of the set of messages; and
   generating a recommendation to change the set of filters based on the similarity measure.

2. The computer-implemented method of claim 1, wherein the recommendation indicates that a new filter be added to the set of filters as a result of the similarity measure being below a threshold level of similarity, the new filter matching the new message.

3. The computer-implemented method of claim 1, wherein the recommendation indicates that a regular expression associated with the filter be modified to match the new message as a result of the similarity measure being greater than a threshold level of similarity.

4. The computer-implemented method of claim 1, further comprising:

identifying a path through the flow network that represents the set of messages; and assigning a weight to each node in the path based on a number of nodes at each level of the flow network.

5. A system, comprising:

one or more processors; and memory that stores computer-executable instructions that, if executed, cause the one or more processors to:

acquire a set of messages that match a filter, wherein the filter is defined by a regular expression;

generate a flow network from the set of messages, different paths in the flow network representing different messages in the set of messages, and each node in the flow network representing one or more tokens of one or more messages;

determine, using the flow network, that a new message not matching the filter is similar to the set of messages; and cause a parameter of the filter to be adjusted so that the filter matches the new message.

6. The system of claim 5, wherein:

the flow network includes a set of nodes connected by directional edges;

the set of nodes includes a start node and an end node; and a path through the flow network represents a message in the set of messages and each node in the path corresponds to a token of the message.

7. The system of claim 5, wherein the computer-executable instructions further cause the system to select a path of nodes through the flow network, the nodes in the path selected based at least in part on a frequency of occurrence of a token in the set of messages.

8. The system of claim 7, wherein a weight is assigned to each of the nodes at a level of the flow network based at least in part on a number of nodes at the level of the flow network.

9. The system of claim 7, wherein a weight assigned to a node in the path is reduced as a result of a number of nodes in a corresponding level of the flow network.

10. The system of claim 5, wherein the set of messages are preprocessed to remove a timestamp value, a device name, a network address, an interface name, or an identifier.

11. The system of claim 5, wherein the computer-executable instructions further cause the one or more processors to:

determine, using the flow network, that a particular message does not match the filter and is not similar to the set of messages; and provide information that identifies the particular message to a user.

12. The system of claim 11, wherein:

the particular message is a security log entry; and the information indicates that the particular message suggests a security anomaly.

13. A non-transitory computer-readable storage medium having stored thereon executable instructions that, as a result of being executed by one or more processors of a computer system, cause the computer system to at least:

acquire a set of value sequences that match a filter, wherein the filter is defined by a regular expression;

generate a flow network using a set of token sequences derived from the set of value sequences, the flow network comprising a first path representing a first token sequence of the set of token sequences and a second path representing a second token sequence of the set of token sequences, and each node in the flow network representing one or more tokens of the set of token sequences;

determine, using the flow network, that a new message that does not match the filter is similar to the messages in the set of value sequences; and process the new message in accordance with the message matching the filter.

14. The non-transitory computer-readable storage medium of claim 13, wherein:

the instructions further comprise instructions that, as a result of being executed by the one or more processors, cause the computer system to store, in a memory accessible to the computer system, a set of parameters that define the filter; and the set of parameters includes a filter specification in a pattern matching language.

15. The non-transitory computer-readable storage medium of claim 14, wherein the pattern matching language is Backus-Naur form.

16. The non-transitory computer-readable storage medium of claim 13, wherein the instructions further comprise instructions that, as a result of being executed by the one or more processors, cause the computer system to:

generate tokens for each value sequence in the set of value sequences, each node in the flow network corresponding to a token present in the set of value sequences;

identify a path through the flow network;

generate a sequence of tokens from the new message; and compare the sequence of tokens to the path.

17. The non-transitory computer-readable storage medium of claim 13, wherein the instructions further comprise instructions that, as a result of being executed by the one or more processors, cause the computer system to:

identify, within a value sequence, a token that is inconsistent across the set of value sequences; and remove the token.

18. The non-transitory computer-readable storage medium of claim 13, wherein:

the set of value sequences is provided by a client computer system; and the flow network defines the filter.

19. The non-transitory computer-readable storage medium of claim 13, wherein the instructions further comprise instructions that, as a result of being executed by the one or more processors, cause the computer system to provide an indication that the new message matches the filter.

20. The non-transitory computer-readable storage medium of claim 13, wherein the messages are log entries generated by an application running on a computer system.

* * * * *